United States Patent [19]

Moeller et al.

[11] Patent Number: 4,882,062
[45] Date of Patent: Nov. 21, 1989

[54] SOLVENT MIXING CHAMBER FOR A LIQUID CHROMATOGRAPHY SYSTEM

[75] Inventors: Roy P. Moeller, Hayward; Carl L. Schackelford, San Pablo, both of Calif.

[73] Assignee: Rainin Instrument Co., Inc., Emeryville, Calif.

[21] Appl. No.: 188,680

[22] Filed: Apr. 29, 1988

Related U.S. Application Data

[63] Continuation of Ser. No. 902,255, Aug. 29, 1986, abandoned.

[51] Int. Cl.[4] .................. B01D 15/08; B01F 13/08; C02F 1/48
[52] U.S. Cl. .................. 210/656; 210/101; 210/198.2; 210/450; 285/410; 204/155; 366/273
[58] Field of Search .............. 210/101, 198.2, 656, 210/450, 635, 695; 366/273, 274; 220/3; 285/410; 204/155

[56] References Cited

U.S. PATENT DOCUMENTS

| 3,595,531 | 7/1971 | Williams et al. | 366/273 |
| 3,672,704 | 6/1972 | Christianson | 285/410 |
| 3,934,456 | 1/1976 | Munk | 210/198.2 |
| 4,451,364 | 5/1984 | Higgens et al. | 210/198.2 |
| 4,496,245 | 1/1985 | Conrad et al. | 366/273 |
| 4,728,500 | 3/1988 | Higo | 366/274 |
| 4,806,238 | 2/1989 | Sättler et al. | 210/198.2 |

FOREIGN PATENT DOCUMENTS

| 3344754 | 6/1985 | Fed. Rep. of Germany | 366/273 |
| 521596 | 3/1955 | Italy | 220/3 |
| 59-52518 | 3/1984 | Japan | 366/273 |
| 2082930 | 3/1982 | United Kingdom | 366/273 |

Primary Examiner—Richard V. Fisher
Assistant Examiner—Joseph Drodge
Attorney, Agent, or Firm—Robert R. Meads

[57] ABSTRACT

A liquid chromatography system mixing chamber having a motor-driven magnet situated beside an interior compartment wherein one or more stirring magnets are disposed for mixing solvents fed to the mixing chamber by appropriate metering pumps. A fitting is provided having an expandable ring seal, the fitting being insertable into the interior compartment for effecting a high-pressure seal for preventing leakage of the solvent mixture, while enabling access to the interior of the mixing chamber for maintenance purposes without the need for a tool.

8 Claims, 3 Drawing Sheets

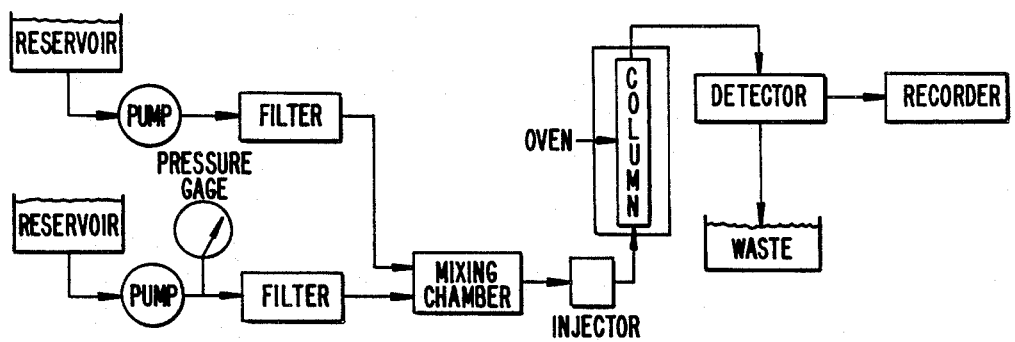
FIG._1.
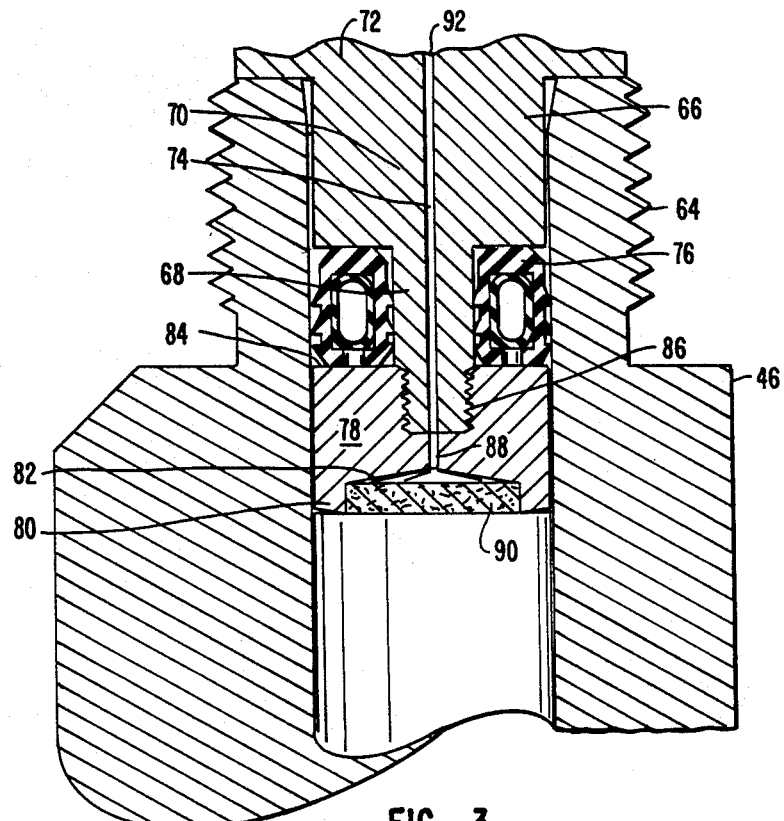
FIG._3.

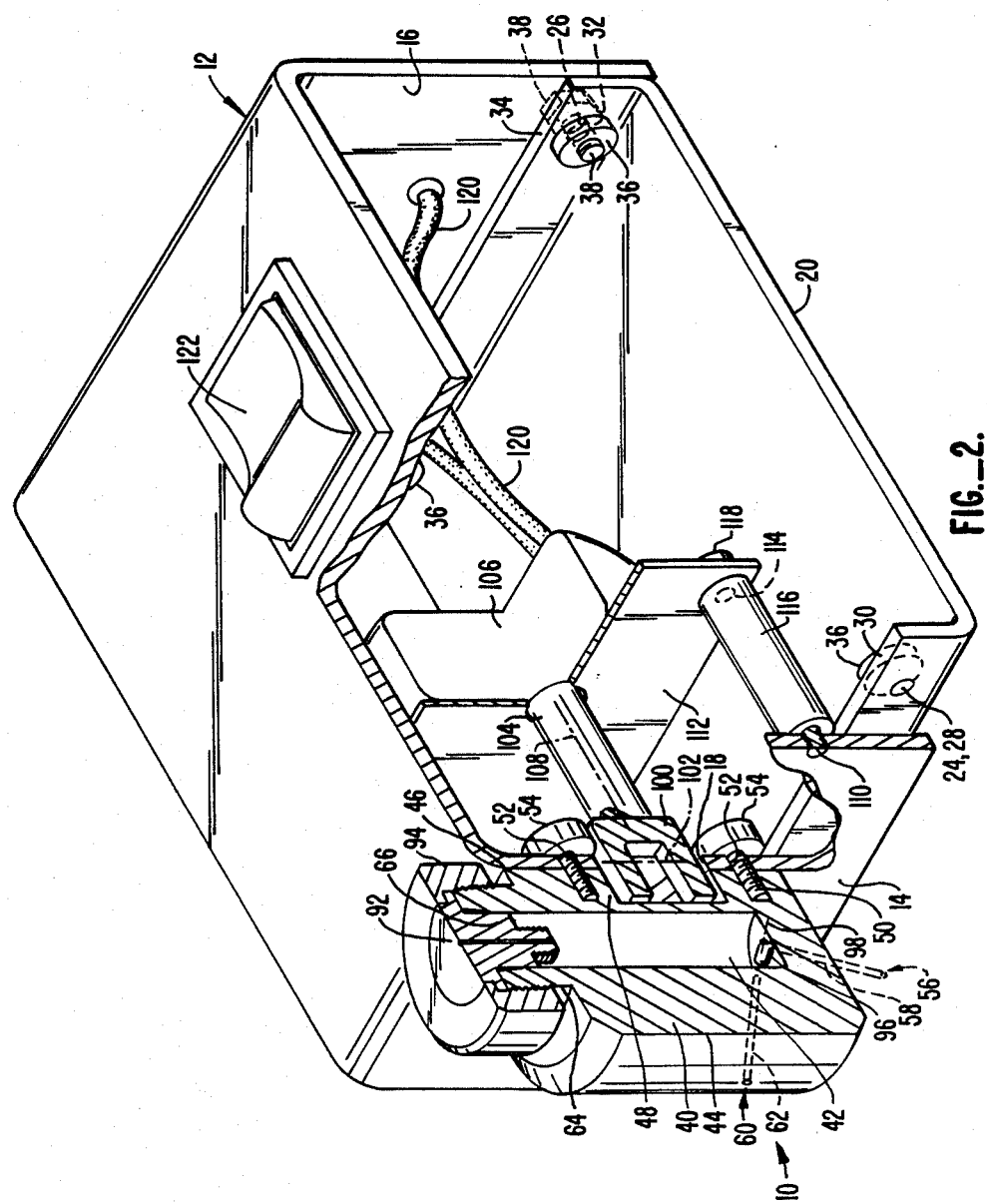
FIG._2.

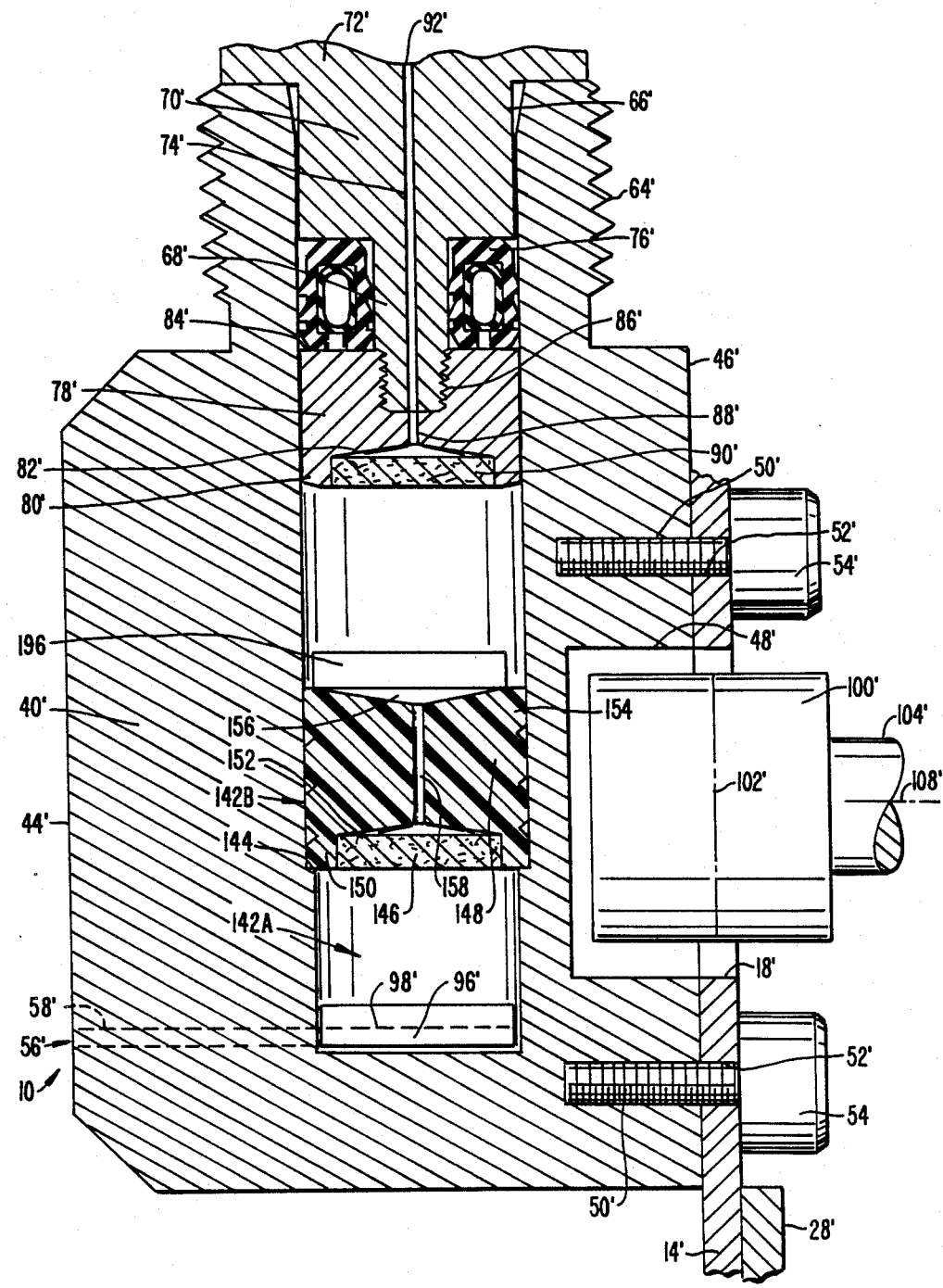
FIG._4.

SOLVENT MIXING CHAMBER FOR A LIQUID CHROMATOGRAPHY SYSTEM

This is a continuation of copending application Ser. No. 902,255 filed on Aug. 29, 1986, now abandoned.

BACKGROUND OF THE INVENTION

This invention relates to liquid chromatography and, more particularly, to liquid chromatography equipment utilized in analytical semi-preparative and preparative liquid chromatography separation processes. Specifically, the invention is directed to a novel and useful apparatus and method for mixing appropriate solvents prior to introduction of the mixture into a liquid chromatography column.

Liquid chromatography separation processes are routinely utilized for the analysis of the concentrations of components in liquid samples, typically organic compounds. Liquid chromatography involves introducing one or more solvents and injecting a sample into a column.

Liquid chromatography is a versatile analytical technique due, in part, to the large variety of mobile and stationary phases available. Both polar and non-polar samples can be handled, and separations are obtained on the basis of type and number of functional groups, as well as molecular weight.

Instrumentation for liquid chromatography varies greatly. A schematic diagram of a typical liquid chromatograph is shown in FIG. 1.

The reservoirs contain the solvents to be used as the mobile phase, which are filtered at some point before entering the column. The pumps are very important part of a liquid chromatograph since, without high-pressure capability, liquid chromatography is very time consuming. Both mechanical and pneumatic pumps are used. The pumps can be reciprocating mechanical pumps. Alternatively, constant-displacement mechanical pumps and pneumatic pumps have been incorporated into liquid chromatographs for reducing the amplitude of pulsations. Preferably, the solvents are metered to respective ports of the mixing chamber and admixed prior to introduction into the column.

A pressure gage is typically incorporated into the liquid chromatograph for monitoring the column inlet pressure. One of the more common sample introduction systems consists of an injection port into which the sample is introduced by a syringe through a septum. This necessitates the use of a microsyringe capable of withstanding the high pressures in the liquid chromatograph. The column is typically stainless steel, but heavy-walled glass or glass-lined metal columns are also utilized.

The most commonly used liquid chromatography detector is the ultraviolet photometric detector, but differential refractometers and solute transport detectors are also commonly utilized. Spectra are recorded as a function of elution time by a recorder, and a chromatogram is generated for evaluation.

Known pumps utilized in liquid chromatography systems inherently produce a pulsed flow. The purpose of the mixing chamber is not only to mix the solvents, but also to counteract the effects of pulsed, as opposed to continuous, metering of solvents prior to introduction of the mixture into the column. The mixing chamber averages, or integrates, the metered flows of solvent fed to the input ports of the mixing chamber. The mixing chamber can have plural chambers so as to form a multi-stage mixing chamber for improving the integration characteristic of the mixing chamber.

Unfortunately, the configurations of known mixing chambers have several disadvantages. Typically, known mixing chambers are structured so that the ports for the solvents to be mixed communicate with a sealed compartment on the interior of the mixing chamber. A stirring magnet is disposed within the compartment. A motor is axially positioned beneath the compartment, and a permanent magnet is attached to the drive shaft of the motor for magnetic coupling to the stirring magnet. The compartment communicates through a frit filter to the output port of the mixing chamber, which is also typically axially situated with respect to the compartment and motor/drive magnet assembly. In instances of multi-stage mixing chambers, plural compartments separated by frit filters are typically oriented one above the other in axial alignment between the motor/drive magnet assembly and the output port of the mixing chamber.

As a result, the height of the mixing chamber can be substantial, and the mixing chamber becomes a cumbersome piece of equipment. The size and weight of the mixing chamber are exacerbated by the fact that, as more compartments are added in series in the mixing chamber, the size of the permanent magnet needed for producing a sufficient magnetic field to couple with the stirring magnets increases, as does the size of the motor needed for rotating the drive magnet. This situation is aggravated by the fact that a larger motor is required which increases the construction cost of the mixing chamber.

Moreover, all of the magnets in known multistage mixing chambers rotate in the same direction. If the drive magnet does not have a sufficient strength, the magnetic coupling to the upper stage stirring magnets is insufficient for rotating the stirring magnets, and mixing does not occur in these mixing chambers.

Furthermore, known mixing chambers are operated in a high-pressure environment and must therefore be sealed for preventing leakage of the solvents. Known mixing chambers are typically configured so that the output port is integrated into a threaded cap, which is screwed into a threaded bore in the structure which houses the one or more mixing compartments. The lip of the threaded end of the cap is tightened against a hard plastic gasket, such as a KEL-F (registered trademark) gasket, which resides on a shoulder at the end of the threaded bore, to effect a seal in order to prevent escape of liquid. This requires that the cap be tightened by a large wrench to prevent leakage. Unfortunately, when maintenance of the mixing chamber is required, for example, when one or more frit filters must be replaced, a tool must be found to disassemble the mixing chamber in order to access the interior of the mixing chamber, and a substantial torque must be applied to loosen the cap. If the needed tool is not at hand, significant downtime can result.

SUMMARY OF THE INVENTION

This invention provides an improved configuration for a mixing chamber for two or more solvents, positioned between the supplies of these liquids and a liquid chromatography column. In one aspect, the invention provides an improved apparatus and method for actuating the stirring magnet or magnets in the mixing chamber. In accordance with one embodiment of the invention, a solvent mixing chamber for a liquid chromatography system is provided which comprises, in combination: pressure bottle means having an inner region defining an interior compartment in fluid communication with at least two solvent input ports, on the one hand, and at least one output port, on the other hand; a stirring magnet having an axis parallel to an imaginary line joining the poles thereof, the stirring magnet being disposed in the interior compartment and rotatable in a first plane defined by rotating the axis of the stirring magnet about an imaginary pivot intermediate the poles thereof; a drive magnet having an axis parallel to an imaginary line joining the poles thereof, the drive magnet being disposed exterior to the pressure bottle means and rotatable in a second plane defined by rotating the axis of the drive magnet about an imaginary pivot intermediate the poles thereof; and means for rotatably mounting the drive magnet so that the stirring magnet and the drive magnet are magnetically coupled and the first and second planes are approximately perpendicular; whereby rotation of the drive magnet in the second plane causes rotation of the stirring magnet in the first plane. Preferably, a motor imparts rotary movement to the drive magnet, the drive magnet preferably being directly secured to the drive shaft of the motor with the axis of the drive shaft being perpendicular to the axis of the drive magnet. Furthermore, a method in accordance with the invention for mixing at least two solvents for introduction into a liquid chromatography column comprises the steps of: providing a pressure bottle means having an inner region defining an interior compartment; flowing the at least two solvents into the interior compartment; disposing a stirring magnet in the interior compartment, the stirring magnet having an axis parallel to an imaginary line joining the poles thereof and rotatable in a first plane defined by rotating the axis of the stirring magnet about an imaginary pivot intermediate the poles thereof; disposing a drive magnet exterior to the pressure bottle means, the drive magnet having an axis parallel to an imaginary line joining the poles thereof and being rotatable in a second plane defined by rotating the axis of the drive magnet about an imaginary pivot intermediate the poles thereof; rotatably mounting the drive magnet so that the stirring magnet and the drive magnet are magnetically coupled and the first and second planes are approximately perpendicular; and imparting rotation to the drive magnet in the second plane for causing rotation of the stirring magnet in the first plane. Preferably, the drive magnet is connected to the drive shaft of a motor which is activated for rotating the drive magnet and, in turn, the stirring magnet. The rotation of the drive magnet has a continuous rotary characteristic, while the rotation of the stirring magnet has a ratchet-like rotary characteristic. Furthermore, the stirring magnet can have a component of movement in a direction parallel to the second plane during rotation of the stirring magnet and the drive magnet.

In another aspect, the invention provides an improved apparatus and method for sealing a solvent mixing chamber in order to enable manual access to the interior compartment without the need for a tool. In accordance with one embodiment of the invention, the pressure bottle means has a neck portion, and the solvent mixing chamber further comprises: a fitting insertable into the neck portion of the pressure bottle means, the fitting having an axial bore therethrough; an expandable ring seal disposed about the fitting; and means connected to the neck portion of the pressure bottle means for retaining the fitting in the pressure bottle means with the axial bore establishing fluid communication between the interior compartment and the output port. Preferably, the neck portion of the pressure bottle means has an inside diameter and an outside diameter; the fitting has a first end with a first diameter less than the inside diameter of the pressure bottle means, a middle portion with a second diameter approximately equal to the inside diameter of the pressure bottle means, and a second end with a third diameter approximately equal to the outside diameter of the pressure bottle means; and the expandable ring seal is disposed about the first end of the fitting. The neck portion of the pressure bottle means is also preferably exteriorly threaded, and the retaining means preferably comprises an interiorly threaded retaining nut rotated onto the neck portion of the pressure bottle means. Furthermore, a method in accordance with the invention for sealing the mixing chamber comprises the steps of: providing pressure bottle means having an inner region forming an interior compartment, the pressure bottle means having a neck portion; inserting a fitting into the neck portion of the pressure bottle means, the fitting having an axial bore therethrough; disposing an expandable ring seal about the fitting; and retaining the fitting in the pressure bottle means with the axial bore establishing fluid communication between the interior compartment and the output port.

The solvent mixing chamber in accordance with the invention is more compact than known mixing chambers, due to the repositioning of the motor/drive magnet assembly with respect to the stirring magnet or magnets. Furthermore, especially in the case where plural mixing compartments and stirring magnets are provided, the solvent mixing chamber in accordance with the invention is more reliable and has a lower construction cost due to equal magnetic coupling between the drive magnet and the stirring magnets, which permits the drive magnet to be smaller and, in turn, requiring a smaller motor. Additionally, the fitting, including the expandable ring seal provided in accordance with the invention, provides effective sealing of the mixing chamber and permits manual access to the interior of the mixing chamber without the need for a tool required in the case of known mixing chambers.

BRIEF DESCRIPTION OF THE DRAWINGS

The above and other features and the concomitant advantages of the present invention will be better understood and appreciated by those skilled in the art in view of the description of the preferred embodiments given below in conjunction with the accompanying drawings. In the drawings:

FIG. 1 is a schematic diagram of a liquid chromatograph into which the mixing chamber in accordance with the present invention is preferably incorporated;

FIG. 2 is an isometric view partially in cross-section of a mixing chamber in accordance with one embodiment of the invention;

FIG. 3 is a cross-sectional view of the embodiment of the mixing chamber along line 3—3 shown in FIG. 2; and FIG. 4 is a cross-sectional view similar to FIG. 3 which illustrates a modified embodiment of the mixing chamber shown in FIG. 2.

DETAILED DESCRIPTION OF THE PREFERRED EMBODIMENTS

The present invention provides apparatus and methods for mixing two or more solvents for introduction into a liquid chromatography column, as well as counteracting inaccuracies in the volumes of solvents fed to the column attributable to pulsations in the flows caused by solvent metering pumps. The solvent mixing chamber in accordance with one embodiment of the invention is incorporated into the schematic diagram of the liquid chromatograph shown in FIG. 1 as the mixing chamber in lieu of known mixing chambers. Additionally, the embodiment of the solvent mixing chamber in accordance with the invention includes effective sealing against leakage of the solvent mixture in the presence of high pressures found in liquid chromatographs through the incorporation of a fitting, including an expandable ring seal, which permits manual access to the interior of the mixing chamber in contrast to known mixing chambers which require the use of a tool.

One embodiment of the solvent mixing chamber in accordance with the invention, generally designated by the numeral 10, is shown in FIG. 2. The mixing chamber 10 comprises a housing 12.

The housing 12 includes a first end wall 14 and a second end wall 16. The first end wall 14 has an aperture 18. The housing 12 also includes a base plate 20 which spans the distance between the first end wall 14 and the second end wall 16. Preferably, the first end wall 14 is provided with a plurality of holes 24 proximate a lower end of the first end wall. Similarly, the second end wall 16 is preferably provided with a plurality of holes 26 proximate a lower end of the second end wall. The base plate 20 is preferably U-shaped and includes a plurality of holes 28 in a first leg 30, which associate with the holes 24 in the first end wall 14, as well as a plurality of holes 32 in a second leg 34, which associate with the holes 26 in the second end wall 16, when the base plate is positioned between the first and second end walls. Nuts 36 are preferably welded to the first and second legs 30 and 34 with the threaded bores of the nuts aligned with the holes 28 and 32. When the holes 24 in the first end wall 14 are aligned with the holes 28 in the first leg 30, and the holes 26 in the second end wall 16 are aligned with the holes 32 in the second leg 34, bolts 38 can be inserted through the aligned holes and threadably engaged with the nuts 36 for removably securing the base plate 20 to the first and second end walls.

The mixing chamber 10 further comprises a pressure bottle means or pressure bottle 40 secured to the first end wall 14 of the housing 12. The pressure bottle 40 is provided with a cylindrical cavity so as to provide an inner region defining an interior compartment 42. The pressure bottle 40 also has an approximately cylindrical body 44, except for a flattened portion 46. An indentation 48 is provided in the flattened portion 46. Threaded bores 50 are also provided in the flattened portion 46. The pressure bottle 40 is removably mounted to the housing 12 by aligning the indentation 48 with the aperture 18 and the threaded bores 50 with holes 52 provided in the first end wall 14 whereupon bolts 54 can be inserted through the holes 52 and threadably engaged with the threaded bores 50.

A first solvent input port 56 is provided in the pressure bottle 40 in fluid communication with the interior compartment 42. The first solvent input port 56 includes a first radial bore 58 through the body 44 of the pressure bottle 40. An appropriate fitting (not shown) is connected to the first radial bore 58 for the supply of solvent to the interior compartment 42. Similarly, at least a second solvent input port 60 is provided in the pressure bottle 40 in fluid communication with the interior compartment 42. The second solvent input port 60 includes a second radial bore 62 to which is connected a fitting (not shown) for the supply of solvent to the interior compartment 42.

As shown in FIG. 3, the pressure bottle 40 also includes an exteriorly threaded neck portion 64 with an inside diameter and an outside diameter. A fitting 66 is provided having a first end 68 with a first diameter less than the inside diameter of the interior compartment 42 of the pressure bottle 40. The fitting 66 also has a middle portion 70 with a second diameter approximately equal to the inside diameter of the interior compartment 42 of the pressure bottle 40. Also, the fitting 66 has a second end 72 with a third diameter approximately equal to the outside diameter of the neck portion 64 of the pressure bottle 40. Finally, the fitting 66 has an axial bore 74 therethrough. An expandable ring seal 76 is disposed about the first end 68 of the fitting 66. For example, the seal 76 can be a part No. U300(OP)(.268)GFP, manufactured by Bal Seal, located in Santa Ana, Calif.

Preferably, the first end 68 of the fitting 66 is partially threaded. Also, a carrier 78 is preferably provided having an outside diameter approximately equal to the diameter of the interior compartment 42 of the pressure bottle 40. The carrier 78 has a first end 80 with a countersink 82. The carrier 78 also has a second end 84 with a threaded recess 86 adapted to be threadably engaged with the first end 68 of the fitting 66. Finally, the carrier 78 has an axial bore 88 therethrough interconnecting the countersink 82 and the threaded recess 86 so that the recess is in fluid communication with the countersink. A frit filter 90 is secured in the countersink 82. For example, the frit filter 90 can be press-fitted in the countersink 82.

The seal 76 is first disposed about the first end 68 of the fitting 66. The threaded recess 86 of the carrier 78 is then threadably engaged with the partially threaded first end 68 of the fitting 66 for securing the carrier to the fitting. The seal 76 is captured on the first end 68 of the fitting 66 between the middle portion 70 of the fitting and the second end 84 of the carrier 78 when the carrier is rotated onto the fitting. Furthermore, the axial bore 88 of the carrier 78 is in fluid communication with the axial bore 74 of the fitting 66 when the carrier is rotated onto the fitting. The axial bore 74 of the fitting 66 constitutes an output port 92 which is, in turn, connected to the inlet of a liquid chromatography column by means of a fitting (not shown).

A means 94 is also provided for retaining the fitting 66, seal 76, and carrier 78 in the pressure bottle 40 with the interior compartment 42 in fluid communication with the output port 92. Preferably, the retaining means 94 comprises an interiorly threaded retaining nut rotated onto the exteriorly threaded neck portion 64 of the pressure bottle 40.

The mixing chamber 10 also comprises at least one stirring magnet 96 having an axis 98 parallel to an imaginary line joining the poles thereof. The stirring magnet 96 is disposed in the interior compartment 42 and rotatable in a first plane defined by rotating the axis 98 of the stirring magnet about an imaginary pivot point intermediate the poles thereof.

Furthermore, the mixing chamber 10 comprises a drive magnet 100 having an axis 102 parallel to an imaginary line joining the poles thereof. The drive magnet 100 is disposed exterior to the pressure bottle 40 and is rotatable in a second plane defined by rotating the axis 102 of the drive magnet about an imaginary pivot intermediate the poles thereof.

As shown in FIG. 2, the drive magnet 100 preferably resides in the indentation 48 provided in the flattened portion 46 of the pressure bottle 40. Location of the drive magnet 100 within the indentation 48 reduces the distance between the drive magnet and the stirring magnet 96, thereby increasing the magnetic coupling between the drive magnet and the stirring magnet. The drive magnet 100 is rotatably mounted so that the stirring magnet 96 and the drive magnet 100 are magnetically coupled and the first and second planes are approximately perpendicular. Preferably, the drive magnet 100 is connected to a drive shaft 104 of a motor 106, such as an electrically powered motor. For example, the motor 106 can be a part No. ACK81301-P4, manufactured by Air Pax Corporation, located in Cheshire, Conn.

Preferably, the drive magnet 100 is directly secured to the drive shaft 104, the drive shaft having an axis 108 perpendicular to the axis 102 of the drive magnet. The first end wall 14 preferably includes threaded bores 110. The motor 106 includes a face plate 112 having holes 114. The motor 106 is mounted to the housing 12 by aligning standoffs 116 between the holes 114 and the threaded bores 110 and extending bolts 118 through the holes 114 and the standoffs into threaded engagement with the threaded bores 110.

Electrical power is connected to the motor 106 by means of wires 120. A toggle switch 122 is preferably interposed in one of the wires 120 for controlling energization of &:he motor 106. Alternatively, the motor 106 can be a pneumatic motor supplied by pressurized air or other type of motor.

In operation, a solvent is fed to the first solvent input port 56 by a solvent metering pump (not shown). Similarly, a solvent is fed to the second solvent input port 60 by a solvent metering pump (not shown). The solvents flow through the first and second radial bores 58 and 62 into the interior compartment 42. The pressure within the interior compartment 42 causes the seal 76 to expand and effect a seal between the first end 68 of the fitting 66 and the wall of the interior compartment 42 so as to prevent leakage of the solvent mixture. The solvent mixture flows from the interior compartment 42 through the frit filter 90, axial bore 88 in the carrier 78, and axial bore 74 in the fitting 66 to the output port 92. The retaining means 94 fixes the fitting 66, seal 76, carrier 78, and frit filter 90 in the pressure bottle 40 with the seal in sealing engagement between the first end 68 of the fitting and the wall of the interior compartment 42.

The toggle switch 122 is actuated for supplying electrical power to the motor 106. The drive magnet 100 is connected to the drive shaft 104 of the motor 106. When the motor 106 is energized, the drive magnet 100 is rotated in the second plane defined by rotating the axis 102 of the drive magnet about an imaginary pivot intermediate the poles thereof. The drive magnet 100 is magnetically coupled to the stirring magnet 96 disposed in the interior compartment 42. Rotation of the drive magnet 100 in the second plane causes rotation of the stirring magnet 96 in the first plane defined by rotating the axis 98 of the stirring magnet about an imaginary pivot intermediate the poles thereof. Disposition of the motor 106 and the drive magnet 100 in a position to the side of the pressure bottle 40, as shown in FIG. 2, reduces the overall height of the mixing chamber 10 as compared to known mixing chambers where the motor and the drive magnet are disposed beneath and in axial alignment with the mixing compartment.

The motor 106 rotates the drive magnet 100 so that the rotation of the drive magnet 100 can be described as a continuous rotary movement. However, continuous rotary movement of the drive magnet 100 in the second plane has been found to produce ratchet-like rotary movement of the stirring magnet 96 in the first plane. Specifically, during steady-state operation, the motor 106 rotates the drive magnet 100 with a constant angular velocity with no periodic or occasional pauses in rotation. Conversely, the magnetic coupling between the drive magnet 100 and the stirring magnet 96 during steady-state operation changes as the drive magnet is rotated. The variation of the magnetic coupling is attributable to the approximately orthogonal relationship of the respective second plane of rotation of the drive magnet 100 and the first plane of rotation of the stirring magnet 96. The variation in the strength of magnetic coupling between the drive magnet 100 and the stirring magnet 96 is, at times, insufficient for causing the drive magnet to impart rotary movement to the stirring magnet. Therefore, the rotation of the stirring magnet 96 in the first plane is no longer in phase and loses synchronization with rotation of the drive magnet 100. However, as the drive magnet 100 continues to be rotated, the magnetic coupling between the drive magnet and the stirring magnet 96 again increases sufficiently for the rotation of the drive magnet to impart rotation to the stirring magnet. The inertia of the stirring magnet 96 is overcome, and the stirring magnet begins to rotate with an angular acceleration depending on the misalignment of the respective magnetic fields of the drive magnet 100 and the stirring magnet. The ratchet-like or stepwise movement of the stirring magnet 96 provides agitation for effective mixing of the solvents.

Furthermore, as shown in FIG. 2, the drive magnet 100 is not only positioned beside the stirring magnet 96, but is also situated at a position which is axially offset from the stirring magnet along the axis of the interior compartment 42. As a result, during steady-state operation, the stirring magnet 96 has a component of movement in a direction parallel to the second plane along the axis of the interior compartment 42. Specifically, the positive magnetic coupling between the drive magnet 100 and the stirring magnet 96 draws the stirring magnet toward a position opposite the drive magnet, while gravity and negative magnetic coupling cause the stirring magnet to return to the bottom of the interior compartment 42.

In a modification of the chamber 10, a plurality of interior compartments is provided for mixing the solvents, as well as for integrating the flows of solvent for counteracting the effects of pulsations produced by the metering pumps for the solvents. Accordingly, the interior compartment 42 shown in FIG. 2 is preferably reconfigured as shown in FIG. 4 so that the inner region of the pressure bottle 40' is provided with a first interior compartment 142A and a second interior compartment 142B formed respectively by adjoining portions of the inner region having different diameters and separated by a shoulder 144. Preferably, the first interior compartment 142A is separated from the second interior compartment 142B by a frit filter 146 at the interface between the first interior compartment and the second interior compartment.

As shown in FIG. 4, a plug 148, preferably constructed from a plastic material, is provided having a first end 150 with a countersink 152. The plug 148 also has a second end 154 having a depression 156. The plug 148 also has an axial bore 158 therethrough so that the countersink 152 is in fluid communication with the depression 156. The periphery of the plug 148 is preferably ribbed for sealing against the wall of the second interior compartment 142B for constraining the solvent mixture to flow through the axial bore 158. The frit filter 146 is preferably press-fitted into the countersink 152. The diameter of the plug 148 is such that the first end 150 rests on the shoulder 144 when the plug is inserted into the pressure bottle 40'. Another stirring magnet 196 is disposed in the second interior compartment 142B atop the plug 148, that is, in a position closer to the output port 92 than the plug. The magnetic coupling between the drive magnet 100' and each of the stirring magnets 96' and 196 is preferably equal.

In operation, the solvents are fed by appropriate metering pumps (not shown) to the first and second solvent input ports 56' and 60'. The solvents flow through the first and second radial bores 58' and 62' into the first interior compartment 142A. The stirring magnet 96' is magnetically coupled to the drive magnet 100' so that the stirring magnet 96' rotates when the drive magnet is rotated by the motor 106' upon energization of the motor. The solvents are mixed in the first interior compartment 142A.

Thereafter, the initially admixed solvents flow through the frit filter 146 and the axial bore 158 in the plug 148 into the second interior compartment 142B. The stirring magnet 196 is also magnetically coupled to the drive magnet 100' so that the stirring magnet 196 rotates when the drive magnet is rotated by the motor 106' upon energization of the motor. In contrast to the direction of rotation of the stirring magnet 96', the direction of rotation of the stirring magnet 196 is in an opposite direction. Stated differently, rotation of the stirring magnet 96' can be clockwise about the axis of the pressure bottle 40', whereas rotation of the stirring magnet 196 can be counterclockwise about the axis of the pressure bottle, or vice-versa, depending on the direction of rotation of the drive magnet 100'. This is in contrast to the stirring magnets in known multi-stage mixing chambers, which rotate in the same direction.

The solvents are agitated by the stirring magnet 196 in the second interior compartment 142B. Thereafter, the admixed solvents flow through the frit filter 90', axial bore 88' in the carrier 78', and axial bore 74' in the fitting 66' to the output port 92'.

Additional interior compartments can be connected in series, analogous to the stacking of the second interior compartment 142B atop the first interior compartment 142A, as shown in FIG. 4. Preferably, a frit filter, such as the frit filter 146 which separates the first interior compartment 142A from the second interior compartment 142B, is interposed between adjacent interior compartments. Stirring magnets, such as the additional stirring magnet 196, are disposed in the additional interior compartments. This provides a multi-stage mixing chamber 10 having any desired number of mixing compartments.

The location of the drive magnet 100' beside the stirring magnets 96' and 196 reduces the overall height of the mixing chamber 10 as compared to the height of known multi-stage mixing chambers. Furthermore, disposition of the drive magnet 100' beside the stirring magnets 96' and 196 provides more effective magnetic coupling between the drive magnet and the stirring magnet 196, unlike known multi-stage mixing chambers where the drive magnet is positioned beneath and axially aligned with all stirring magnets.

The foregoing description is offered primarily for purposes of illustration. While a variety of embodiments has been disclosed, it will be readily apparent to those skilled in the art that numerous other modifications and variations not mentioned above can still be made. For example, a T-connection and a solitary input port can be utilized in lieu of plural sample input ports. Furthermore, an element having a restrictive passage for preventing transfer of turbulence can be substituted for each or any of the frit filters, although though the frit filter nearest the output port is preferably retained for entrapping wear particles from the stirring magnets. However, such modifications and variations can be made without departing from the spirit and scope of the invention as claimed below.

What is claimed is:

1. A solvent mixing chamber for a liquid chromatography system comprising:
    pressure bottle means having an inner region forming an interior compartment in fluid communication with at least two solvent receiving input ports and an output port for connection to a column, the pressure bottle means having an exteriorly threaded neck with an inside diameter and an outside diameter;
    a fitting insertable into the neck of the pressure bottle means, the fitting having an axial bore therethrough, a first end with a first diameter less than the inside diameter of the neck, a middle portion with a second diameter approximately equal to the inside diameter of the neck, and a second end with a third diameter approximately equal to the outside diameter of the neck;
    an expandable ring seal disposed about the first end of the fitting;
    an interiorly threaded retaining nut rotated onto the neck of the pressure bottle means for retaining the fitting in the pressure bottle means with the axial bore establishing fluid communication between the interior compartment and the output port;
    a stirring magnet having an axis parallel to an imaginary line joining the poles thereof and disposed in the interior compartment;
    a drive magnet having an axis parallel to an imaginary line joining the poles thereof;
    a motor;
    means for rotatably mounting the drive magnet with the axis of the drive magnet approximately perpendicular to the axis of the stirring magnet so that the drive magnet is magnetically coupled to the stirring magnet; and
    means for connecting the drive magnet to the motor whereby activating the motor imparts rotary movement to the drive magnet which, in turn, causes rotation of the stirring magnet.

2. The solvent mixing chamber in accordance with claim 1 wherein the first end of the fitting is partially threaded, further comprising:

a carrier having an outside diameter approximately equal to the inside diameter of the pressure bottle means, the carrier having a first end with a countersink, a second end with a threaded recess adapted to be threadably engaged with the first end of the fitting, and an axial bore interconnecting the countersink and the recess so that the recess is in fluid communication with the countersink, the axial bore of the carrier being in fluid communication with the axial bore of the fitting and the expandable ring seal being captured on the first end of the fitting between the middle portion of the fitting and the second end of the carrier when the carrier is rotated onto the fitting; and a frit filter secured in the countersink.

3. A solvent mixing chamber for a liquid chromatography system having an interior compartment in fluid communication with an input port for receiving a solvent, and an output port in fluid communication with the interior compartment and adapted to be connected to a liquid chromatography column, comprising in combination:

pressure bottle means having an inner region forming the interior compartment, the pressure bottle means having an open neck with a smooth interior and an externally threaded exterior portion;

a fitting insertable into the open neck of the pressure bottle means, the fitting having an axial bore therethrough, a first end within and narrower than the interior of the neck, a middle portion having a smooth exterior and a diameter substantially equal to the interior of the neck, and second end external to and larger than the interior of the neck;

an expandable ring seal disposed about the first end of the fitting; and hand-turnable retaining means including an internally threaded nut mating with the threaded exterior of the neck for retaining the fitting in the pressure bottle means with the axial bore establishing fluid communication between the interior compartment and the output port.

4. The solvent mixing chamber in accordance with claim 3 wherein the first end of the fitting is partially threaded, further comprising:

a carrier having an outside diameter approximately equal to the inside diameter of the pressure bottle means, the carrier having a first end with a countersink, a second end with a threaded recess adapted to be threadably engaged with the first end of the fitting, and an axial bore interconnecting the countersink and the recess so that the recess is in fluid communication with the countersink, the axial bore of the carrier being in fluid communication with the output port and the expandable ring seal being captured on the first end of the fitting between the middle portion of the fitting and the second end of the carrier when the carrier is rotated onto the fitting; and a frit filter secured in the countersink.

5. A method for simultaneously mixing solvents in a multicompartment mixer in a liquid chromatography system, each compartment containing a stirring magnet, the method comprising the steps of:

generating a rotating magnetic drive field external to the mixer by a single magnet on a single axis of rotation;

supporting each stirring magnet in it compartment for rotation in a plane transverse to the rotating drive field; and locating the drive field so that it coupled substantially equally to each stirring magnet whereby rotation of the drive field produces stirring rotation by each stirring magnet in its plane of rotation transverse to the rotting drive field.

6. The method of claim 5 wherein the multicompartment mixer includes at least two compartments each containing a stirring magnet and where in the step of generating the drive field a drive magnet is turned on an axis of rotation substantially parallel to and between the stirring magnets in the two compartments whereby the drive field oppositely couples the two stirring magnets and produces rotation of the stirring magnets in opposite direction.

7. A solvent mixer comprising:

a chamber having a plurality of separate compartments for mixing solvents;

a stirring magnet in each compartment, each stirring magnet having an axis parallel to an imaginary line joining poles at opposite ends thereof;

means in each compartment supporting each stirring magnet for rotation in a plane defined by rotating its axis about a pivot point between the poles thereof;

a single drive magnet for generating a drive field, and means for mounting the drive magnet external to the compartments for rotation in a plane substantially normal to and on a drive axis substantially parallel to the planes of rotation of the stirring magnets with substantially equal coupling of the drive field to each of the stirring magnets, whereby the rotation of the drive magnet produces a rotation by each of the stirring magnets in its plane of rotation transverse to the plane of rotation of the drive magnets.

8. The solvent mixer of claim 7, wherein:

the chamber includes two adjacent compartments with the stirring magnets supported for rotation in first and second substantially parallel planes; and the drive magnet is supported with the drive axis in a plane substantially parallel to and between the first and second planes to magnetically couple to and rotate the stirring magnets in opposite directions.

* * * * *